US005946276A

United States Patent [19]
Ridges et al.

[11] Patent Number: 5,946,276
[45] Date of Patent: Aug. 31, 1999

[54] DATA FLOW MANAGEMENT SYSTEM FOR RECORDABLE MEDIA

[75] Inventors: John C. Ridges, Golden, Colo.; Thomas P. Fowler, Bloomington, Minn.; David C. Burns, Crystal, Minn.; Kim H. Kimmerle, Maple Grove, Minn.

[73] Assignee: Rimage Corporation, Edina, Minn.

[21] Appl. No.: 08/752,449

[22] Filed: Nov. 15, 1996

[51] Int. Cl.⁶ .................................................. G11B 17/22
[52] U.S. Cl. ............................................ 369/32; 395/438
[58] Field of Search ............................... 369/32, 47, 54, 369/58; 360/77.08, 77.02; 395/843, 438, 310, 404, 550; 364/246.91

[56] References Cited

U.S. PATENT DOCUMENTS

| | | | |
|---|---|---|---|
| 5,029,125 | 7/1991 | Sciupac | 364/900 |
| 5,418,713 | 5/1995 | Allen | 364/403 |
| 5,473,584 | 12/1995 | Oshima | 369/32 |
| 5,485,448 | 1/1996 | Kishi et al. | 369/99 |
| 5,513,162 | 4/1996 | Kishi et al. | 369/54 |
| 5,517,631 | 5/1996 | Machado et al. | 395/438 |
| 5,518,325 | 5/1996 | Kahle | 400/70 |
| 5,551,054 | 8/1996 | Packer | 395/843 |
| 5,634,042 | 5/1997 | Kashiwagi et al. | 395/550 |

OTHER PUBLICATIONS

"Kodak Disc Transporter brochure", *Eastman Kodak Company*, (1994).
"Kodak PCD Writer 600 brochure", *Eastman Kodak Company*, (1994).
"Kodak PCD Writer 600 Interface Guide", *Eastman Kodak Company*, Part No. 3B2900, 1–32, (Mar. 1995).
"The CD:/Recordable Driver Letter", *CD-ROM Professional*, 93–100, (Apr. 1996).
"Yamaha CDR100/CDR102 Installation Guide & Product Specifications", *Yamaha Corporation*, 1–51.

*Primary Examiner*—Ali Neyzari
*Attorney, Agent, or Firm*—Schwegman, Lundberg, Woessner, and Kluth, P.A.

[57] ABSTRACT

A media recording system is described which insures a fast uninterrupted recording. The system includes a media recorder and a data storage unit assigned to the media recorder. A controller is provided which operates parallel to a central processing unit such that data is transferred from the data storage unit to the media recorder without interruption. The media can be a recordable compact disc (CD-R) and the controller can be a programmable SCSI bus.

11 Claims, 2 Drawing Sheets

DATA FLOW MANAGEMENT SYSTEM FOR RECORDABLE MEDIA

TECHNICAL FIELD OF THE INVENTION

The present invention relates generally to data recording systems and in particular the present invention relates to data management in data recording systems.

BACKGROUND OF THE INVENTION

Numerous types of recordable media are available for storing digital data. One type of media available is recordable compact disk, known as a Compact Disk Recordable (CD-R). CD-R is a write-once optical medium containing an organic die layer fabricated over a layer of gold. The organic die layer is used for storing data and the gold layer is used to reflect light during a read operation. To store data on the CD-R medium, a recorder device is used to change the state of the organic die layer. Typically, a laser is provided in the recorder and used to change the state of the organic die in such a manner that the flection of a light source is modified. That is, during a read operation a focused light beam is directed through the organic die layer. If the light is reflected back to the light source, data stored at that location is in a particular state, for example a logical zero. If the light source is deflected, the data stored at that location is in a different state, for example a logical one.

A CD-R is structured into one or more tracks where a track represents an organized unit of information. The term 'track' as used herein represents a continuous stream of information and is not to be confused with the concentric 'tracks' found in random access recording media.

There are two different methods of writing data to a compact disk: packet writing, and track-at-once. Packet writing allows data to be written in small segments called 'packets.' While packet writing is inherently safe and can be performed directly from a CPU application, it requires the CD recorder to be recalibrated to a home position prior to recording each packet. The required recalibration slows the recording process, and is thus is not suitable for high speed data replication systems.

The second method for data storage is track-at-once, or disk-at-once, and requires that a continuous uninterrupted stream of data be written to the medium at one time. If the data flow is interrupted, the medium is rendered useless. This is a result of the inability to locate the position of the last written data. An interruption of the data storage is referred to herein as an under-run.

Recordable media, such as CD-R are typically used in conjunction with a central processing unit (CPU) and a recording device. The recording device is used to store and retrieve data from the recordable medium in response to the CPU. The storage operation is typically controlled by a program which operates as a standard operation above the operating system. Underruns, therefore, occur primarily as a result of interruptions of the program; for example, interruption by a preemptive multi-tasking operating system. Thus, if a multi-task operating system such as Windows NT™, or OS2™ is used with the CPU, underruns can occur when the operating system takes control away from the program used to control data storage.

For the reasons stated above, and for other reasons stated below which will become apparent to those skilled in the art upon reading and understanding the present specification, there is a need in the art for a system and method of storing data to a recordable medium without interruption by an operating system.

SUMMARY OF THE INVENTION

The above mentioned problems with data storage and other problems are addressed by the present invention and which will be understood by reading and studying the following specification. A data flow management system is described which operates outside of an operating system to store data to a recordable medium.

In particular, the present invention describes a data recording system comprising a data recording device for storing data on a recordable medium, a data storage device, and a controllable data bus. The controllable data bus is coupled to the data recording device and the data storage device for controlling an uninterrupted data transfer from the data storage device to the data recording device. The system further comprises a processor coupled to the controllable data bus and adapted to use an operating system program, the processor adapted to initiate the data transfer from the data storage device to the data recording device without interruption by the operating system program.

In another embodiment, a data recording system comprises a central processing unit having data storage memory, a data recording device, a data storage unit, and a controller coupled to the central processing unit, the data recording device, and the data storage unit. The controller operates in parallel to the central processing unit for controlling an uninterrupted data transfer from the data storage unit to the data recording device.

In yet another embodiment, a method for recording data onto a recordable medium is described. The method comprises the steps of allocating a recording device to the recording process, directing a controllable data bus to copy the data from a data storage device to a buffer storage device assigned to the allocated recording device, and directing the controllable data bus to record the data from the buffer storage device onto the recordable medium using the allocated recording device.

BRIEF DESCRIPTION OF THE DRAWINGS

FIG. 4 illustrates a recording system according to the present invention;

FIG. 5 is a detailed illustration of a transporter of FIG. 4;

FIG. 6 illustrates a portion of the system of FIG. 3;

FIG. 7 is a function block diagram of an application program for controlling the operation of the system of FIG. 3; and FIG. 8 is a flow chart of the operation of the application program of FIG. 4.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1:
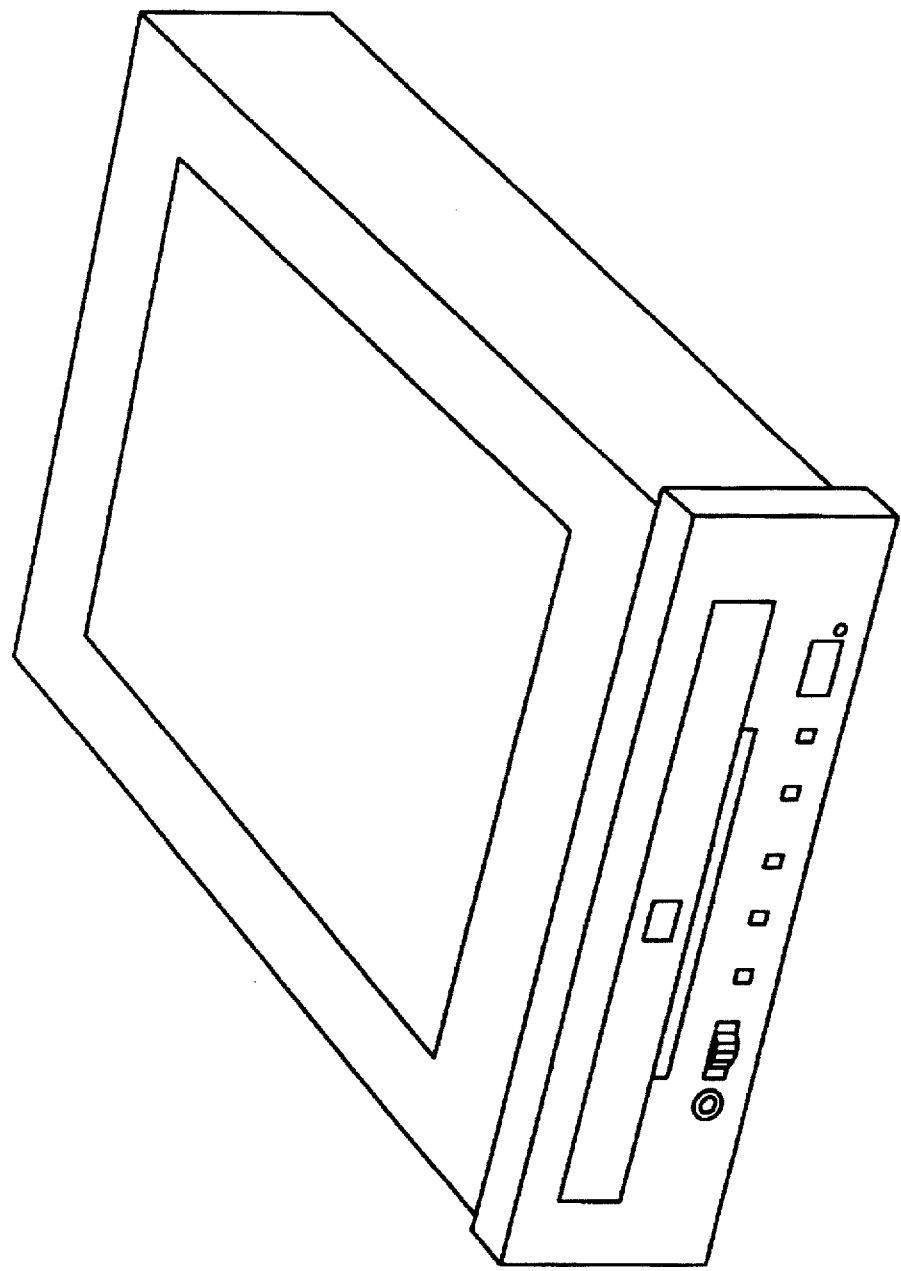
FIG. 1 is a compact disc data recorder.

To record data on a specific digital medium, such as CD-R, Erasable Compact Disc (CDE) or Digital Versatile Disc (DVD), a commercially available recorder can be used. These recorders typically resemble a magnetic diskette drive used in personal computers. FIG. 1 illustrates a typical recorder used for CD-R. It is contemplated that other types of recording devices are equally applicable to the present invention and are not limited to the example of FIG. 1. The recording devices are classified according to speed. A standard base speed for a recorder is 150 k bytes per second, and the recorders are presently available in 1x through 6x. That is, a 4x recorder operates at 4 times 150 k bytes per second, or 600 k bytes per second. It will be appreciated by those skilled in the art that recorders operating at speeds in excess of 6x can be used with the present invention.

Figure 2:
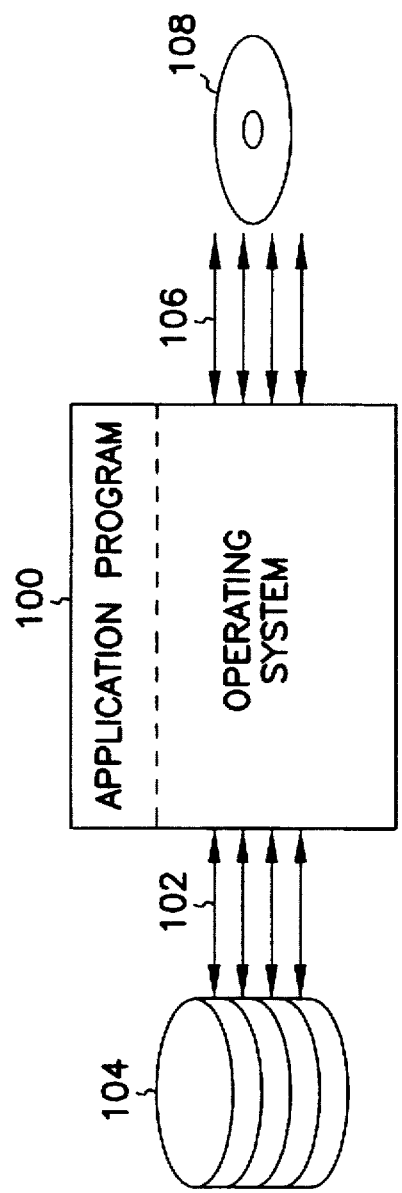
FIG. 2 is a diagram of a prior art recording system.

Several methods are presently employed to store digital data on a CD-R disc from a data image. The first method is an Application Controlled Recording using a local storage device, see FIG. 2. A CPU 100 is operating an application program which reads a portion of an image file stored in a storage device 104 via system data bus 102. The CPU is operating using a standard operating system such as Windows NT™. A portion of the image is stored into memory provided in the CPU 100 using the operating system and CPU facilities. The application program then writes the portion of the image to the CD-R recorder 108 via system data bus 106. Additional portions of the data image are read from the storage device and written to the recorder until the image is fully copied. The success of the Application Controlled Recording method depends on the application program gaining sufficient access to system resources to permit the data replication to occur without underrunning the writing process and ruining the CD-R recording.

A second method of recording data on CD-R is an Application Controlled Recording where the data image is provided using a network storage device. This method is similar to the method described above, except the data image must first be transferred from network storage to the local storage 104. This intermediate data storage is necessary because, in general, networks are too slow and unpredictable to permit recording directly from the network to the recorder. The method then follows the steps described for recording using the local storage device. As with the above described method, the success of this method depends on the application program gaining sufficient access to system resources to permit the data replication to occur without underrunning the writing process and ruining the CD-R recording.

Yet another method of recording data is an Application Controlled Multiplexed Recording method. This method can be used with a local storage device. Alternatively, a network can be used by intermediately storing data on the local storage device. To store data to multiple CD-R recorders, a multiplexer is located between the CPU and the multiple CD-R recorders. In this system the multiplexer appears to be a single device to the application and operating system, but is connected to multiple recorders to make several identical copies concurrently.

SCSI BUS

The system data bus 106 can be connected to a Small Computer System Interface (SCSI). As known to those skilled in the art, a SCSI is an expansion bus which is used to connect multiple SCSI devices. The current version of SCSI is referred to as SCSI-2. Communication on the SCSI bus is allowed between only two SCSI devices at any given time. There is a maximum of eight SCSI devices, and each device is assigned a SCSI address. A SCSI system consists of one or more initiators, which are able to issue commands on the SCSI bus, and one or more targets, which perform commands received from an initiator. For example, an initiator could be a CPU of a computer system. This initiator might issue commands via the SCSI bus to a disk drive. The disk drive would be the target. Activity by initiators and targets on the SCSI bus is accomplished by a transaction cycle consisting of the phases named: BUS FREE, ARBITRATION, SELECTION, RESELECTION, COMMAND, DATA IN, DATA OUT, STATUS, MESSAGE IN, and MESSAGE OUT. A SCSI controller is provided to maintain communication between SCSI devices. A detailed description of the operation of SCSI-2 is not provided herein, but because SCSI is an ANSI standard it is known to those skilled in the art. Refer to KODAK PCD WRITER 600, version 3.3, Interface Guide, March 1995, for additional detail on SCSI-2, herein incorporated by reference.

Many SCSI devices can implement what is known as a SCSI copy command. The SCSI copy process involves two devices attached to the SCSI bus. One is the data source and the other is the data target. A portion of the data to be recorded is read from the source and recorded on the target. The read-write process continues until the desired amount of data has been transferred. No other activity is permitted on the SCSI bus until the two active devices have completed their operation. The SCSI copy command, therefore, does not allow parallel activity while a copy is being made. Staging additional data for copying must occur after the current copying is completed.

DATA RECORDING SYSTEM

As explained above, CD-R is a write-once optical medium which is structured into one or more tracks. Writing data to a CD-R requires that once writing a track has begun, it must continue uninterrupted. If the recording process is interrupted, an underrun occurs and the recording is ruined.

Data used to create a recording on CD-R media can be stored as an image file or it can come from a master CD disc directly. The term 'image' is used herein to represent either case. The current capacity of a CD-R is approximately 680 million bytes of data. Properly staging an image of this size requires considerable time before recording can begin.

Figure 3:
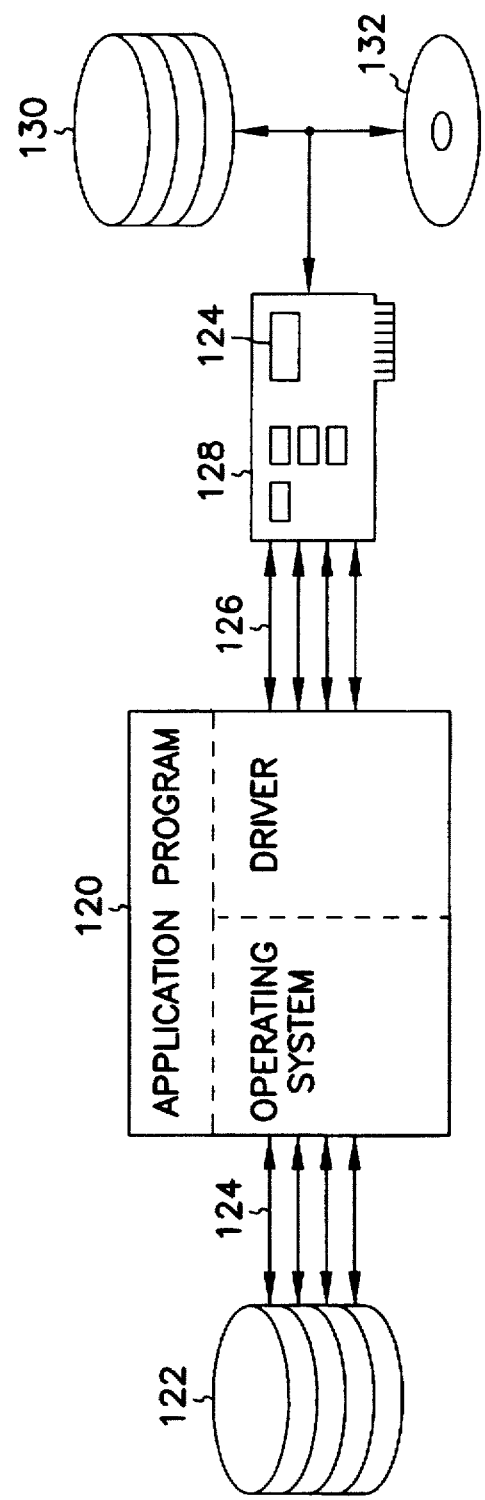
FIG. 3 is a diagram of a data recording system of the present invention.

The present invention provides a highly efficient means of producing multiple CD-R recordings in a way that eliminates the possibility of underrunning the process and thereby ruining the recording. Referring to FIG. 3, a block diagram of a data recording system of the present invention is described.

A CPU 120 operates using a multi-tasking operating system and executing an application program. The CPU also executes a driver program. A storage device 122, either local or network, is coupled to the CPU via a data bus 124. Data bus 126 couples an expansion bus 128 to the CPU. A buffer storage device 130 and at least one media recorder 132 are connected to the expansion bus. It will be appreciated that the media recorder can be used to record CD-R, and that the expansion bus can be a SCSI bus. Further, it will be appreciated that multiple recorders can be used with a single storage device. Data bus 124 and data bus 126 can be implemented as the same data bus, but are illustrated as separate buses for ease of description.

The data image to be recorded is located on the storage device 122 connected to the CPU either directly or indirectly via a network. The data image flows into the CPU's memory (not shown) via data bus 124 under control of the operating system which is being directed by the application program. The image is transferred from the CPU's memory via data bus 126 to a buffer storage device 130 via the expansion bus 128. The expansion bus may also be termed 'expansion channel.' The application program initiates this transfer via the driver program. The buffer storage device is 'owned' by the driver and is not available to other programs in the CPU.

Once the image has been transferred to the buffer storage device, recording of the image onto the recordable medium (CD-R disc) in the recorder is initiated by the application program via the driver program. Once initiated, maintaining the transfer is accomplished by the expansion bus controller 134, which operates parallel to the CPU 120, without intervention by the driver, operating system, or application program.

While the recording is taking place, the application program begins to transfer a second image to the buffer storage device 130 via the driver program in parallel with the first data recording. This overlap enables a subsequent image to be copied with minimal delay following completion of the current recording and results in uniquely high production rates.

RECORDING SYSTEM COMPONENTS

Referring to FIG. 4, the recording system 200 supports multiple media transporter mechanisms 202, each with a printer, one through four recorders in simultaneous operation, and a 100 mhz network interface 208. The system operates the transporters from a common job queue. Each of the recorders operates between 2× and 6× speeds; however, recorders operating at faster speeds can be used.

The system is configured as shown, with a central control system 204, multiple transporters 202, and a user-interface 206 illustrated by a monitor and keyboard. The system may also incorporate optional recorders which are not installed in a transporter (not shown).

FIG. 5 is a more detailed illustration of a transporter. The transporter contains multiple recorders 132, a CD printer 212, a verifier 214, and media loading/unloading apparatus 216 and 218 used to move the media from one device to another. The transporter is capable of implementing all media transfer operations between the recorders, printer and verifier without human intervention, under the supervision of the control software.

The input/output mechanism 220 is a rotating set of three bins. Blanks are stacked into one of the empty bins, from which they are picked up by the vertical motion arm 218. The arm then deposits the blank into a tray of a recorder 132 under control of the system software. Once the disk is recorded, the arm removes it from the recorder and places it into the printer 212, where a label, image, or other indicia is applied to the disk surface. The arm then removes the disk from the printer. At this time the input/output mechanism 220 rotates to place the output bin under the arm. The arm 218 descends and places the completed copy in the bin. In the event of an error, the vertical motion arm removes the disk from the device which is in error and deposits it into the third bin which is reserved for rejected disks. It will be appreciated that the transporter mechanism can be used to load and unload a recordable medium from the recorder in a system which does not include a printer or verifier.

Data for the recorders 132 is provided through SCSI connectors located on the back of the transporter. The transporter mechanism 216–218 and the printer 212 are fed through a serial interface cable, also located on the back of the transporter.

SYSTEM OPERATION

In a multi-processing environment an application program has no control over the time and/or rate at which it is executed. The CPU operating system schedules the execution of the program without any regard to the program requirements. It is a well-known principle among system programmers that a real-time system may never be executed by a multitasking operating system with any assurance of success. CD-Recording is, in fact, a real-time operation, and may not be arbitrarily interrupted without ruining the recording medium.

The unique solution to this problem is to remove the actual recording of the media from control of the system processor, and to directly control all resources used by the process. This is accomplished by using a SCSI device as the expansion bus 128 which is capable of being programmed independently of the system processor 120, and by supplying it with resources which are not visible to the operating system. It will be appreciated by those skilled in the art that other intelligent controllers can be used for the expansion bus 128. These resources are preferably a two gigabyte hard disk provided as the buffer storage device 130 and a block of system memory 222, see FIG. 6. In this manner, the operating system need only start the recording process. The SCSI device then may independently complete the operation outside of the operating system's control. This prevents the process from being interrupted, and frees the system for other work at the same time. When the operation is completed, the adapter notifies the system and waits for an new command.

The SCSI adapter is also capable of directly accessing system memory, for use as buffer space and program storage. The entire recording process and all other operations which might impact the recording process are delegated to the adapter, bypassing the usual difficulties imposed by a multitasking operating system. However, the control application may still take full advantage of the operating system's other capabilities.

The second major difficulty of CD-Recording is the lack of performance. Each disk may contain as much as 680 million bytes of data. The scheduling system implemented in the present invention takes maximum advantage of the multi-processing capabilities of the newer operating systems to improve throughput.

The two major time-consuming operations are the transfer of the data to be recorded to the system, and the recording of the data onto the media. These operations are necessarily sequential. However, with the use of some scheduling algorithms and the above described hardware configuration, 100% overlap of these operations can be obtained which can as much as double the system throughput. This is once again accomplished by programming the SCSI adapter for independent operation.

The hard disk 130 which is dedicated to the recording system is divided into two sections, A and B, see FIG. 6. Section A is active, that is, it contains data which is being recorded to a CD-R. The other section, B, is in a staging mode. This means that it is capable of storing a new set of data which will be recorded when the recorder is finished with its present job. This data is downloaded to the system in segments. The SCSI adapter's primary task is to record the data from the active section onto the CD-R, provided in the recorder 132. There is quite a bit of time, however, when the adapter is not actually busy with this primary operation. When it is free, it looks to see if any new data has been sent for the staging section, B, and moves it onto the disk as it has time. Unlike the recording process, this is not a time-critical operation, so the adapter may interrupt the download operation as often as it needs to keep up with the recording.

FIG. 7 is a functional diagram of one embodiment of the application program that controls the recording operation of the data recording system of FIG. 3. The application program 400 is logically represented as four main modules: a scheduler 401, a work order file manager 403, a system data manager 405, and a job manager 407.

A user initiates the production of a CD-R disc or like media by creating a work order record. The work order record contains various parameters that define a recording process, or job, and is stored in a shared work order file 411. The work order file is managed by the work order manager 403.

The system data manager 405 monitors the status of system resources which are required to produce a CD-R disk. In the embodiment shown in FIG. 7, the resources are the buffer storage device 130 to which the image is written temporarily to facilitate the recording process, and the media recorder 132.

The scheduler 401 is the main control module of the application program 400. The scheduler 401 uses information from the system data manager 405 and from the work order file manager 403 to determine which jobs represented by work order records should be selected for production. The scheduler 401 determines which resources should be allocated to each selected job and stores the work order records in a job queue 409.

The job manager 407 scans the work order records in the job queue 409 to determine the appropriate action to take with respect to each job. The job manager 407 directs the functions of the expansion bus 128, also referred to herein as the controllable data bus. The controllable data bus controls the downloading of data from the storage device 122 to the buffer storage device 130, and the recording of the image from the buffer storage device 130 to the media recorder 132.

A high-level representation of control and data flow in the application program for the system shown in FIG. 3 is illustrated in FIG. 8. Upon initialization at block 501, the application program starts the scheduler 401 and the job manager 407. At block 503, the scheduler 401 monitors status indicators for the recording devices 132 that are updated by the system data manager 405 to indicate the status of the resources.

When the scheduler 401 determines that a data download is complete (block 505) and that the media recorder allocated to the job that requested the download is free (block 515), the scheduler 401 changes the status of the work order record associated with job to 'active' in the job queue 409.

When the scheduler 401 determines that a resource is available (block 507), it selects a work order record in the work order file to be scheduled for processing (block 509). The selection of work order records is based on priority, or on a first-in/first-out basis if all work orders in the work order file 411 have the same priority. The scheduler 401 allocates the necessary available resources to perform the job represented by the selected work order record at block 511.

The scheduler 401 allocates the resources based on the type of job specified in the work order record. A recording session can make a single copy of an image or multiple images. In the case of a work order record defining a job requesting multiple copies, the scheduler 401 determines if a single media recorder 132 should be allocated to make all the copies for, or if multiple media records 132 should be allocated based on the overall system load and job mix. The scheduler 401 also uses resource allocation to facilitate maximum throughput through the system by avoiding collisions among jobs attempting to use a shared resource, and by overlapping tasks within a job wherever possible.

The scheduler 401 updates the work order record to reflect the resources allocated to the job represented by the work order record, changes the status of the work order record to 'pending,' and stores the work order record in a job queue 409 (block 513). The order of work order records in the job queue 409 determines the schedule of the jobs associated with the work order records. The scheduler 401 determines the scheduled order of the jobs in the job queue 409 based on data contained in the work order record. For example, a job that requires a long time to process can be delayed until the system load is normally less so that it does not unduly delay other jobs. The scheduler 401 also uses the availability of resources and user preferences stored in the work order record to determine scheduled order.

In the embodiment shown in FIG. 3, the job manager 407 operates as a separate process from the scheduler 401. The job manager 407 scans the work order records in the job queue 409 (block 521) to determine what jobs need to be processed. When it selects a pending work order record (block 523), the job manager 407 directs the controllable data bus 128 to begin the download process using the resources allocated in the work order record at block 525. When the job manager 407 selects an active work order record (block 527), it directs the controllable data bus 128 to begin the recording process (block 531). If more than one CD-R disk containing the data is required, the job manager 407 directs the controllable data bus 128 to make as many copies as required.

While the application program 400 is described in terms of a software program executing in a central processor, alternate embodiments in which the control and data flow of FIG. 8 are carried out by firmware, different combinations of hardware and software, or a state machine are equally applicable as will be apparent to those skilled in the art. Furthermore, the use of different data management programs to manage the underlying data are also within the scope of the invention.

CONCLUSION

A data recording system has been described which can store data to a recordable medium without interruption by an operating system. The recording system uses a buffer storagedevice, and a data recorder owned by a controller to initiate an uninterrupted data transfer. Additional data can be stored on the buffer storage device in preparation for a subsequent uninterrupted data transfer.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, numerous recordable media can be used with the present system, including Erasable Compact Disc (CDE) and Digital Versatile Disc (DVD). Therefore, it is manifestly intended that this invention be limited only by the claims and the equivalents thereof.

What is claimed is:

1. A data recording system comprising:

a data recording device for storing data on a recordable digital medium selected from the group comprising recordable compact disks (CD-R), erasable compact discs (CDE) and digital versatile discs (DVD);

a buffer storage device;

a controllable small computer system interface (SCSI) bus coupled to the data recording device and the buffer storage device for controlling an uninterrupted data transfer from the buffer storage device to the data recording device; and a processor coupled to the controllable SCSI bus and adapted to use an operating system program, the processor initiates the data transfer from the buffer storage device to the data recording device without interruption by the operating system program to prevent a data under run while storing data to the recordable digital medium.

2. The data recording system of claim 1 further comprising a printer for printing indicia on the recordable digital medium.

3. The data recording system of claim 1 further comprising a transporter mechanism which loads the recordable digital medium in the data recording device, and unloads the recordable digital medium in the data recording device.

4. A method of preventing data underruns in a media recording system, the media recording system comprising a data recording device for storing data on a recordable digital medium, a buffer storage device, a controllable small computer system interface (SCSI) bus coupled to the data recording device and the buffer storage device for controlling an uninterrupted data transfer from the buffer storage device to the data recording device, and a processor coupled to the controllable SCSI bus and using a preemptive multitasking operating system, the method comprising:

storing a first data image in the buffer storage device assigned to the data recording device;

using the processor, initiating a data transfer from the buffer storage device to the data recording device; and using the controllable SCSI bus, transferring the first data image from the buffer storage device to the data recorder such that the data transfer is uninterrupted by the processor to prevent a data under run while storing data to the recordable digital medium.

5. The method of claim 4 further comprising:

storing a second data image in the buffer storage device when the controller is available during transferring the first data image.

6. The data recording system of claim 1 wherein the buffer storage device comprises both a computer hard disk device and a block of system memory.

7. A data recording system comprising:

a transporter comprising:
at least one data recording device for storing data on a recordable digital disc,
a printer to print indicia on the recordable digital disc, and a media loading/unloading apparatus to selectably move the recordable digital disc to either the at least one data recording device or printer;

a buffer storage device;

a controllable small computer system interface (SCSI) bus coupled to the transporter and the buffer storage device for controlling an uninterrupted data transfer from the buffer storage device to the at least one data recording device; and a processor coupled to the controllable SCSI bus and adapted to use an operating system program, the processor initiates the data transfer from the buffer storage device to the data recording device without interruption by the operating system program to prevent a data under run while storing data to the recordable digital disc.

8. The data recording system of claim 7 wherein the processor executes an application program comprising:

a work order file manager to manage work order records;

a system data manager to monitor a status of system resources used to store data to the recordable digital disc;

a scheduler which uses information from the system data manager and from the work order file manager to determine which jobs represented by work order records should be selected for production; and a job manager to initiate the data transfer from the buffer storage device to the data recording device.

9. The data recording system of claim 7 wherein the buffer storage device comprises a magnetic hard drive device.

10. The data recording system of claim 7 further comprising a storage device coupled to the processor, the storage device provides a data image intended to be transferred to the buffer storage device.

11. The method of claim 4 further comprising downloading the first data image from a first storage device using the processor prior to storing the first data image in the buffer storage device.

\* \* \* \* \*